US 7,203,756 B2

(12) United States Patent
Tapperson

(10) Patent No.: US 7,203,756 B2
(45) Date of Patent: Apr. 10, 2007

(54) MECHANISM TO CACHE REFERENCES TO JAVA RMI REMOTE OBJECTS IMPLEMENTING THE UNREFERENCED INTERFACE

(75) Inventor: Kevin Gary Tapperson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 09/844,340

(22) Filed: Apr. 27, 2001

(65) Prior Publication Data
US 2002/0161894 A1 Oct. 31, 2002

(51) Int. Cl.
*G06F 15/16* (2006.01)
*G06F 15/173* (2006.01)

(52) U.S. Cl. ...................... 709/227; 709/223
(58) Field of Classification Search ............... 709/203, 709/227, 223
See application file for complete search history.

(56) References Cited

U.S. PATENT DOCUMENTS

| 5,247,520 | A | * | 9/1993 | Geise et al. ............... 370/469 |
| 5,274,804 | A | * | 12/1993 | Jackson et al. ............ 707/206 |
| 5,371,499 | A | * | 12/1994 | Graybill et al. ............ 341/51 |
| 5,398,334 | A | * | 3/1995 | Topka et al. .............. 707/206 |
| 5,560,003 | A | * | 9/1996 | Nilsen et al. ............. 707/206 |
| 5,692,185 | A | * | 11/1997 | Nilsen et al. ............. 707/104.1 |
| 5,699,361 | A | * | 12/1997 | Ding et al. ............... 370/431 |
| 5,761,511 | A | * | 6/1998 | Gibbons et al. .......... 717/122 |
| 5,768,510 | A | * | 6/1998 | Gish ....................... 709/203 |
| 5,796,393 | A | * | 8/1998 | MacNaughton et al. ... 715/733 |
| 5,832,529 | A | * | 11/1998 | Wollrath et al. .......... 707/206 |
| 5,878,420 | A | * | 3/1999 | de la Salle .............. 707/10 |
| 5,900,001 | A | * | 5/1999 | Wolczko et al. .......... 707/206 |
| 5,903,900 | A | * | 5/1999 | Knippel et al. ........... 707/206 |
| 5,911,144 | A | * | 6/1999 | Schwartz et al. .......... 707/206 |
| 5,915,255 | A | * | 6/1999 | Schwartz et al. .......... 707/206 |
| 5,920,876 | A | * | 7/1999 | Ungar et al. .............. 707/206 |

(Continued)

OTHER PUBLICATIONS

Price, D.W.; Rudys, A.; Wallach, D.S.; "Garbage collector memory accounting in language-based systems." 2003 Symposium on Security and Privacy, May 2003, pp. 263-274.*

(Continued)

*Primary Examiner*—Beatriz Prieto
*Assistant Examiner*—Michael D. Meucci
(74) *Attorney, Agent, or Firm*—Duke W. Yee; Jeffrey S. LaBaw; Wayne P. Bailey

(57) ABSTRACT

A caching mechanism for JAVA RMI remote objects is provided. In order to efficiently implement a cache for these connection objects, the client JYM may hold a normal reference to the object while the connection is in use and for a period of time thereafter. A thread is used as a timer for each connection. After that period of time expires, only a weak reference is held by the client JVM and the connection may be garbage collected. The period of time maybe adjusted. A shorter time may be used to ensure responsiveness of the server JVM to memory demand and shutdown requests, while a longer time may be used to enhance the effectiveness of the caching mechanism by forcing connections to stay open longer after they are no longer being used and before they are automatically destroyed due to garbage collection.

29 Claims, 6 Drawing Sheets

U.S. PATENT DOCUMENTS

| | | | | |
|---|---|---|---|---|
| 6,006,268 A * | 12/1999 | Coile et al. | | 709/227 |
| 6,035,324 A | 3/2000 | Chang et al. | | 709/203 |
| 6,038,572 A * | 3/2000 | Schwartz et al. | | 707/206 |
| 6,047,295 A * | 4/2000 | Endicott et al. | | 707/206 |
| 6,070,184 A | 5/2000 | Blount et al. | | 709/200 |
| 6,073,175 A * | 6/2000 | Tavs et al. | | 709/226 |
| 6,098,080 A * | 8/2000 | Endicott et al. | | 707/206 |
| 6,108,687 A * | 8/2000 | Craig | | 709/203 |
| 6,115,782 A * | 9/2000 | Wolczko et al. | | 711/100 |
| 6,134,603 A * | 10/2000 | Jones et al. | | 719/330 |
| 6,167,535 A * | 12/2000 | Foote et al. | | 714/38 |
| 6,237,060 B1 * | 5/2001 | Shilts et al. | | 711/100 |
| 6,247,060 B1 * | 6/2001 | Boucher et al. | | 709/238 |
| 6,317,775 B1 * | 11/2001 | Coile et al. | | 709/201 |
| 6,338,089 B1 * | 1/2002 | Quinlan | | 709/227 |
| 6,366,558 B1 * | 4/2002 | Howes et al. | | 370/219 |
| 6,414,610 B1 * | 7/2002 | Smith | | 341/106 |
| 6,421,690 B1 * | 7/2002 | Kirk, III | | 707/206 |
| 6,429,860 B1 * | 8/2002 | Hughes | | 345/418 |
| 6,434,543 B1 * | 8/2002 | Goldberg et al. | | 707/2 |
| 6,438,560 B1 * | 8/2002 | Loen | | 707/103 R |
| 6,487,581 B1 * | 11/2002 | Spence et al. | | 709/203 |
| 6,598,094 B1 * | 7/2003 | Wollrath et al. | | 719/330 |
| 6,671,707 B1 * | 12/2003 | Hudson et al. | | 707/206 |
| 6,701,520 B1 * | 3/2004 | Santosuosso et al. | | 717/152 |
| 6,820,261 B1 * | 11/2004 | Bloch | | 718/100 |
| 6,874,074 B1 * | 3/2005 | Burton et al. | | 711/170 |
| 2005/0278726 A1 * | 12/2005 | Cano et al. | | 719/315 |
| 2006/0031282 A1 * | 2/2006 | Tuttle | | 709/203 |

OTHER PUBLICATIONS

Bagguley et al. "Advanced C++ Programmer can't tolerate JAVA" Google Groups comp.lang.java.help; Dec. 7, 1998.*

Weinstein et al. "Writing a JDBC driver—tutorial needed" Google Groups comp.lang.java.databases; Jan. 18-29, 1999.*

Wollrath et al. (A Distributed Object Model for the Java System); Sun Microsystems, Inc.; USENIX Jun. 1996, p. 1-14.*

Landis et al. (ObjectStore PSE: a Persistent Storage Engine for Java); Object Design, Inc.; p. 1-11.*

* cited by examiner

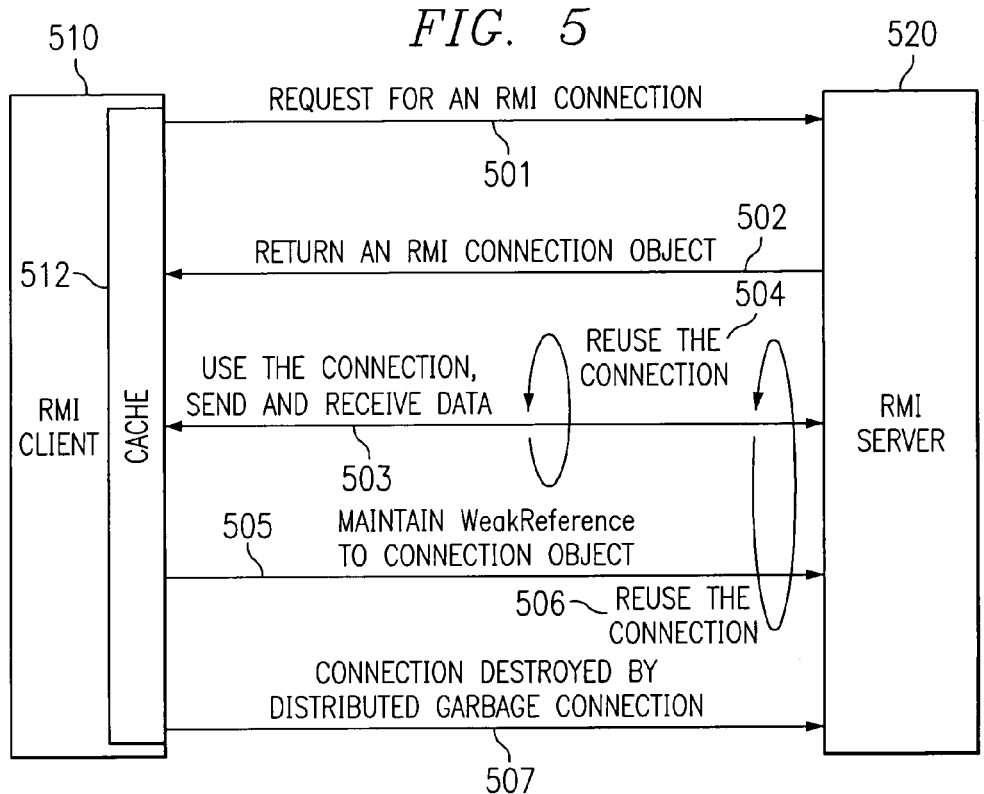
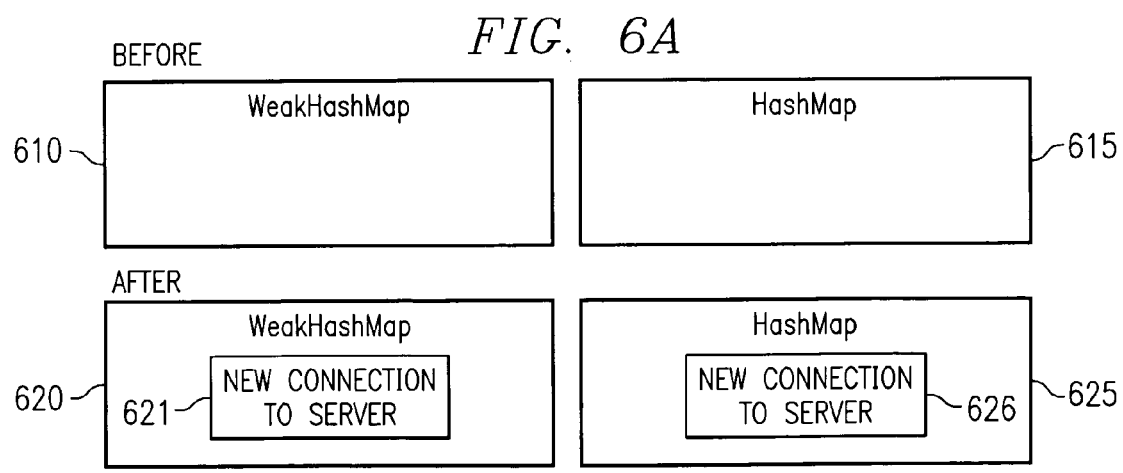

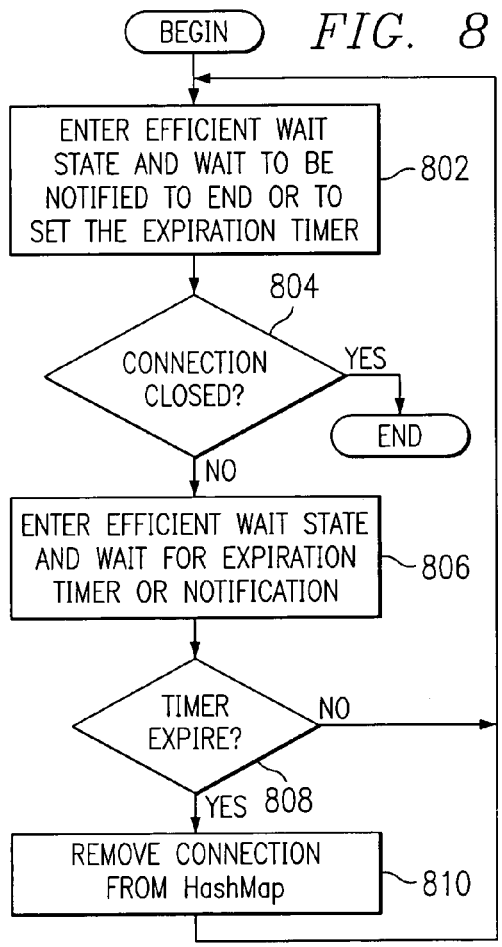
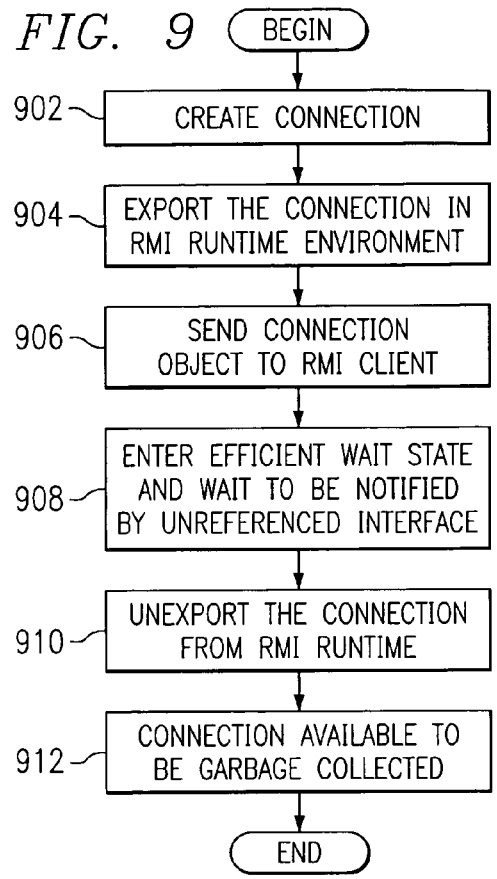
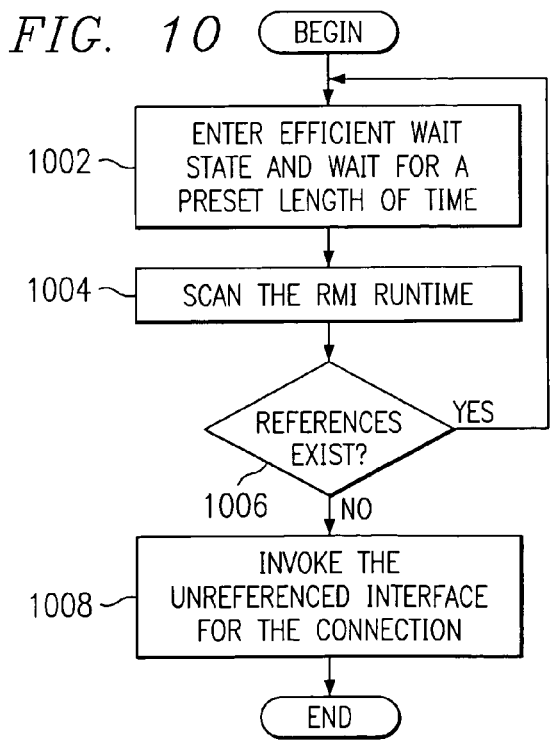

US 7,203,756 B2

MECHANISM TO CACHE REFERENCES TO JAVA RMI REMOTE OBJECTS IMPLEMENTING THE UNREFERENCED INTERFACE

BACKGROUND OF THE INVENTION

1. Technical Field

The present invention relates to data processing systems and, in particular, to remote method invocation in a Java environment. Still more particularly, the present invention provides a method, apparatus, and program for reusing remote method invocation connections.

2. Description of Related Art

Java is a programming language designed to generate applications that can run on all hardware platforms without modification. Java was modeled after C++, and Java programs can be called from within hypertext markup language (HTML) documents or launched stand alone. The source code of a Java program is compiled into an intermediate language called "bytecode," which cannot run by itself. The bytecode must be converted (interpreted) into machine code at runtime. When running a Java application, a Java interpreter (Java Virtual Machine) is invoked. The Java Virtual Machine (JVM) translates the bytecode into machine code and runs it. As a result, Java programs are not dependent on any specific hardware and will run in any computer with the Java Virtual Machine software.

Remote Method Invocation (RMI) is a remote procedure call (RPC), which allows Java objects (software components) stored in a network to be run remotely. In the Java distributed object model, a remote object is one whose methods can be invoked from another JVM, on the same host or potentially on a different host.

Creating an RMI connection between two JVMs can be an expensive process both in terms of time and resources. Thus, it would be advantageous to reuse an established connection when possible. An RMI connection between two JVMs is encapsulated within a Java remote object. A connection can be reused by maintaining a normal reference to the connection object on the RMI client. In order to properly manage these connection objects, the RMI remote object class may implement the Unreferenced interface to allow the object to be notified when it is no longer referenced by a client JVM. When the object is notified via the Unreferenced interface, the object becomes unusable and can be destroyed in response to garbage collection by the server JVM. Garbage collection is a routine that searches memory for program segments or data that are no longer active in order to reclaim that space.

To prevent a remote object from becoming unreferenced and invoking the notification mechanism, a client JVM may hold a normal reference to the connection object. However, holding a normal reference to a connection object prevents the resources that it is using in the server JVM from being reclaimed until the client JVM releases the reference to the object. A problem may occur when the server JVM is instructed to shutdown. If a client JVM still holds a normal reference to a connection object connecting the client JVM to the server JVM, it can prevent or greatly delay the shutdown process of the server JVM. A problem may also occur if the server JVM is running low on memory resources. If the client JVM still holds a normal reference to a connection, the server JVM cannot reclaim the memory used for that object even though the connection may not be needed.

Thus, it would be advantageous to provide an improved mechanism for reusing established RMI connections.

SUMMARY OF THE INVENTION

The present invention implements an efficient caching mechanism for Java RMI remote objects that implement the Unreferenced interface. In order to efficiently manage a cache for these connection objects, the client JVM may hold a normal reference to the object while the connection is in use and for a period of time thereafter. A thread, referred to as a connection expiration thread, is used as a timer for each connection with a normal reference. After that period of time expires, only a weak reference is held by the client JVM and the connection may be garbage collected. The period of time may be adjusted to suit the needs of the server JVM. A shorter time may be used to ensure responsiveness of the server JVM to memory demand and shutdown requests, while a longer time may be used to enhance the effectiveness of the caching mechanism by forcing connections to stay open longer after they are no longer being used and before they are automatically destroyed due to garbage collection by the server JVM.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a mechanism for establishing and reusing RMI connections in accordance with a preferred embodiment of the present invention;

FIGS. 6A–6D are examples of the WeakHashMap and HashMap on an RMI client in accordance with a preferred embodiment of the present invention;

FIG. 8 is a flowchart illustrating the operation of a connection expiration thread running on an RMI client in accordance with a preferred embodiment of the present invention;

FIG. 9 is a flowchart illustrating the operation of an RMI server in accordance with a preferred embodiment of the present invention; and FIG. 10 is a flowchart illustrating the operation of the RMI runtime environment running on the RMI server, specifically the function of the Unreferenced interface and notification mechanism in accordance with a preferred embodiment of the present invention.

DETAILED DESCRIPTION OF THE PREFERRED EMBODIMENT

Figure 1:
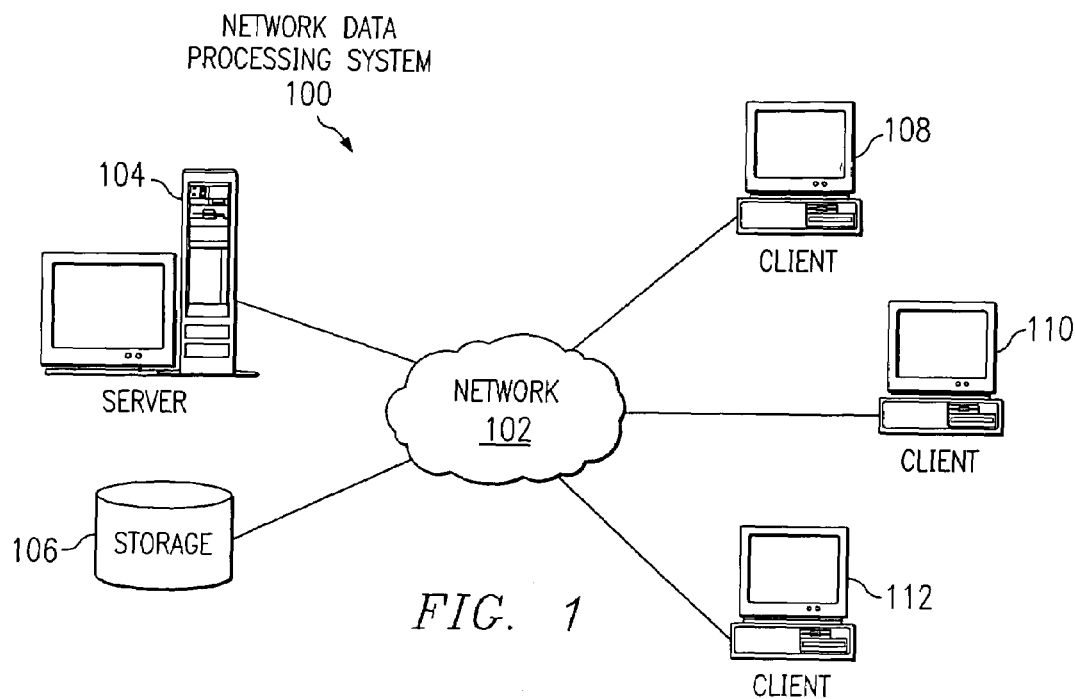
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
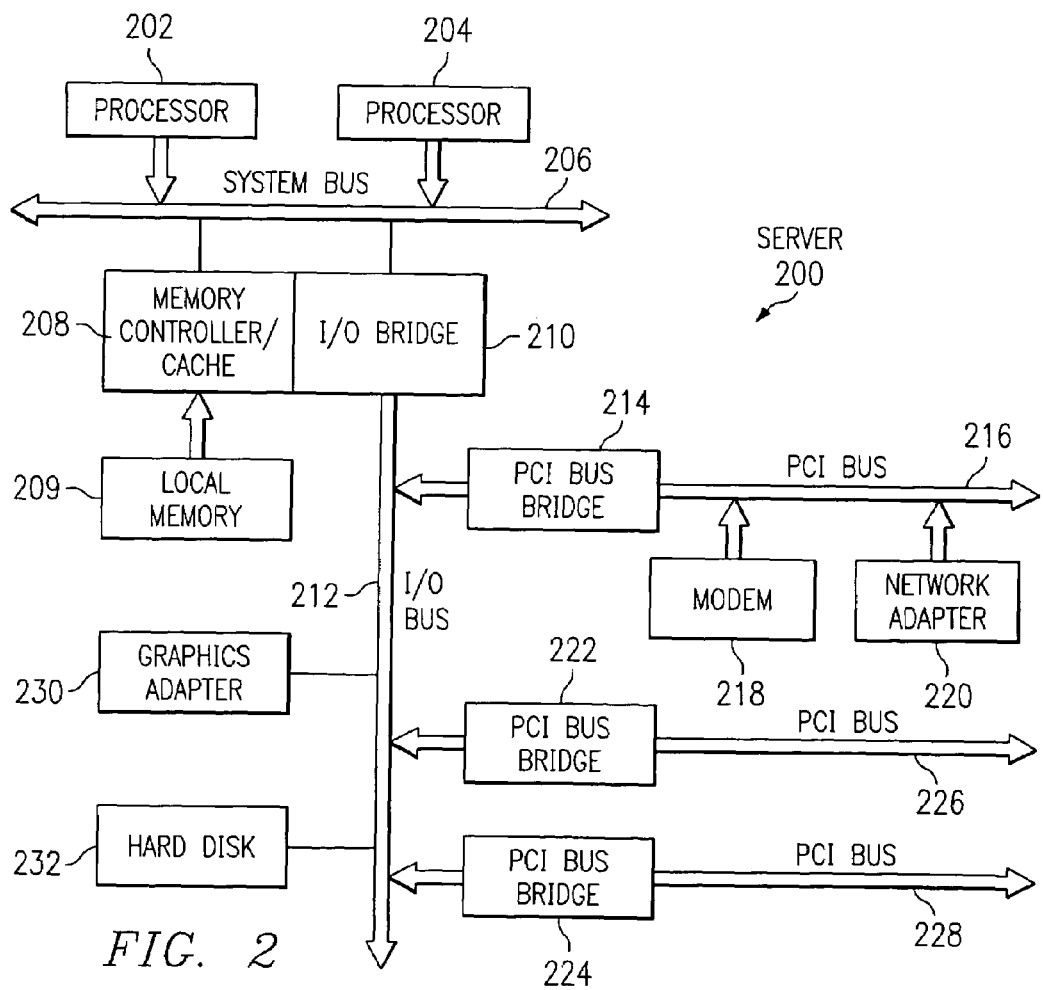
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM Server P Series system, a product of International Business Machines Corporation in Armonk, New York running the Advanced Interactive Executive (AIX) or Linux operating system.

Figure 3:
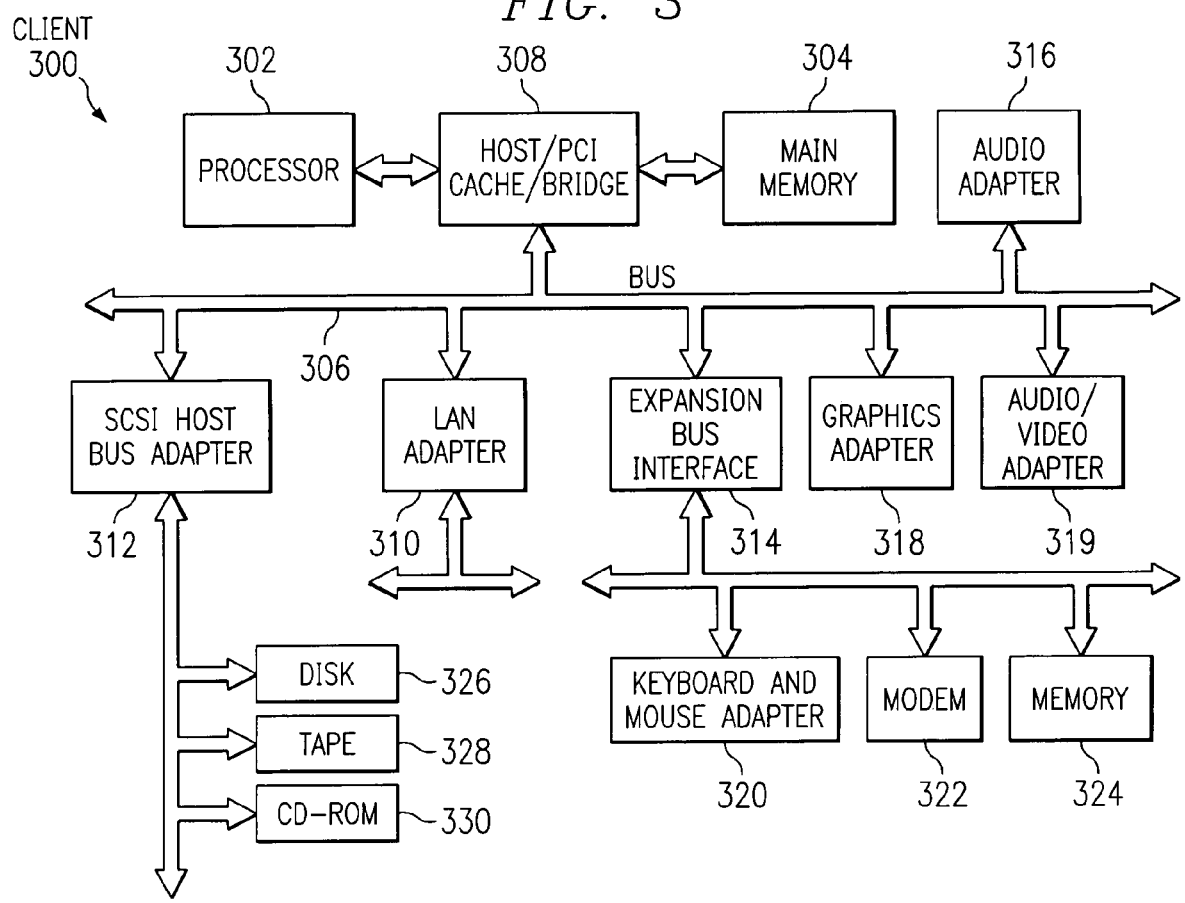
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
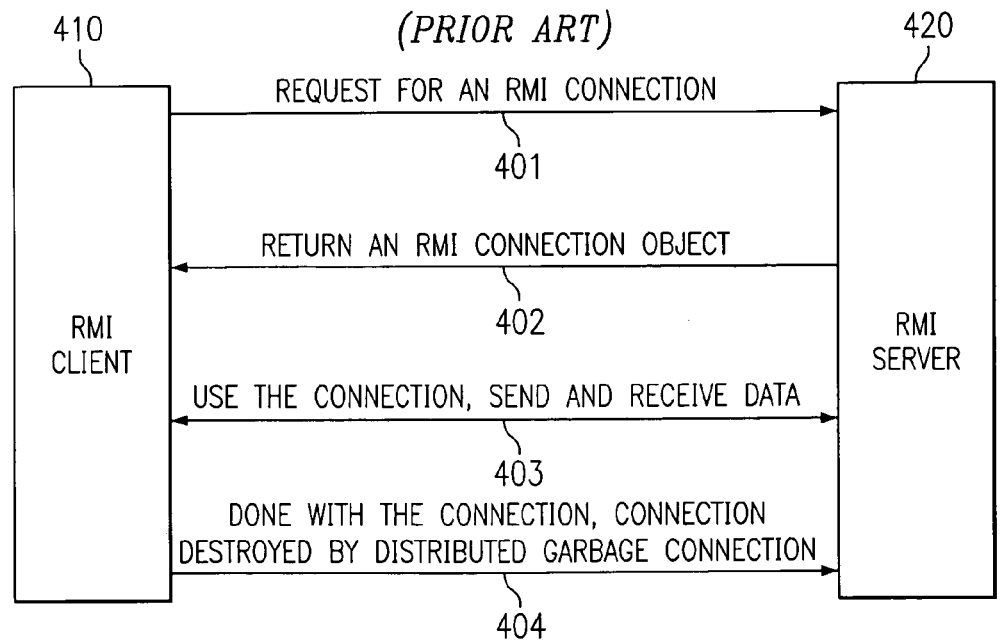
FIG. 4 is a diagram illustrating the problems associated with RMI connection objects in the prior art.

With reference to FIG. 4, a diagram illustrating the problem associated with RMI connection objects in the prior art is shown. FIG. 4 illustrates an RMI client and RMI server without connection caching. Particularly, with respect to FIG. 4, RMI client 410 establishes connections with RMI server 420 as described below:

The RMI client sends a request for an RMI connection to the RMI server (step 401) and the RMI server returns an RMI connection object (step 402). The RMI connection is then used to send and receive data (step 403). When the RMI client is done with the connection, the RMI server destroys the connection object by distributed garbage collection (step 404).

When a new connection is required, the above steps are repeated. Using this mechanism may be expensive from a time standpoint, because it requires a new connection to be established every time data is exchanged.

With reference now to FIG. 5, a diagram illustrating a mechanism for establishing and reusing RMI connections is shown in accordance with a preferred embodiment of the present invention. RMI client 510 establishes connections with RMI server 520. RMI client 510 includes cache 512 to allow connections to be reused as described below:

The RMI client sends a request for an RMI connection to the RMI server (step 501) and the RMI server returns an RMI connection object (step 502). The RMI connection is then used to send and receive data (step 503). After the RMI client is done with the connection, the connection is stored as a normal reference in cache 512. Since the connection object is cached, the RMI connection may be reused to exchange data (step 504).

Maintaining a normal reference to connection objects may be expensive from a memory usage standpoint, because it never allows unused connections to be destroyed through the RMI server garbage collection mechanism. Therefore, in accordance with a preferred embodiment of the present invention, the RMI client sets an expiration timer. When the cache timer expires, the RMI client maintains a weak reference to the connection object (step 505). If a connection to RMI server 520 is needed while the connection object is weakly referenced, the RMI server may reestablish a normal reference to the connection object and the connection may be reused (step 506). However, while the connection object is weakly referenced, the connection object may also be destroyed through the RMI server garbage collection mechanism (step 507).

Using this caching technique, the connection is cached by the RMI client for a specified period of time. If a connection to the RMI server is needed within that time period, the connection is reused. Once the time period expires, the connection may be garbage collected and destroyed by the RMI server. After garbage collection, a new connection must be established to the RMI server.

In accordance with a preferred embodiment of the present invention, an efficient caching mechanism for Java RMI remote objects implements the Unreferenced interface. The Unreferenced interface allows the object to be notified when it is no longer referenced by a client JVM. If a client JVM holds only a weak reference to a connection object, the server JVM may treat the connection object as if there is no client JVM referencing the object. As known in the art, a weak reference is a means to hold a Java object which allows it to be used but also allows it to be available for garbage collection. Invoking the unreferenced interface is the process that happens when the RMI server detects that no client JVMs hold a normal reference to the object. A weakly referenced object is an object that does not prevent its referent from being available for garbage collection. Garbage collection refers to the process of making the object finalizable, invoking the finalize method of the object, and then reclaiming its storage space.

In order to efficiently implement a cache for these connection objects, the client JVM may hold a normal (non-weak) reference to the connection object while the connection is in use and for a period of time thereafter. After that period of time expires, the object may only be held with a weak reference by the client JVM. This allows the connection object to be reused at any time until the server JVM realizes that the connection object is no longer held with a normal reference by the client JVM and invokes the unreferenced mechanism.

A The cache is implemented by both a HashMap and a WeakHashMap. The concepts of weak references, WeakHashMaps, and HashMaps are well known features of Java. When a connection is created, a reference to the connection object is added to both hash maps. When a connection is needed, the WeakHashMap is searched. The HashMap need not be searched, since the WeakHashMap contains a superset of the objects in the HashMap. The HashMap is the cache that contains the normal references to the connection objects.

Each connection object is also modified to contain a test method. The test method is used to test the object and ensure that still responds properly to remote interaction. If the test method throws a RemoteException, the connection object is no longer usable and must be recreated. If a matching connection object is found in the WeakHashMap, the test method is invoked to ensure that the object is still usable.

When a connection is no longer being used, a call is made to the connection expiration thread for this connection object. The connection expiration thread adds the connection object back to the HashMap, if necessary, and waits for a specified amount of time. When the time has elapsed, it then deletes the reference to the connection object from the HashMap. When this happens, the only remaining reference to the connection object is in the WeakHashMap, which is a weak reference. This allows connection objects to be efficiently cached as they are always held as weak references and only held as normal references when they are in use and for a short period of time thereafter.

A normal reference to the connection object is held for a period of time after the connection is no longer in use to ensure that the connection object is available for reuse for at least that period of time. The period of time may be adjusted based upon the implementation. For example, in an implementation which is not likely to reuse connections often, the period of time may be shortened. However, in an implementation in which connections are reused frequently, the period of time may be lengthened to increase the likelihood that the connection object will be held in cache.

The wait time of the connection expiration thread may be adjusted to suit the needs of the server JVM. A shorter time may be used to ensure responsiveness of the server JVM to memory demand and shutdown requests, while a longer time may be used to enhance the effectiveness of the caching mechanism by forcing connections to stay open longer after they are no longer being used and before they are automatically available for garbage collection.

With reference to FIGS. 6A–6D, examples of the WeakHashMap and HashMap on an RMI client are shown in accordance with a preferred embodiment of the present invention. There are four scenarios in reusing connections in accordance with a preferred embodiment of the present invention which can occur; FIGS. 6A–6D show each of these four scenarios.

Particularly, with respect to FIG. 6A, the first flow is shown where a new connection must be established. Both the WeakHashMap 610 and HashMap 615 are empty and contain no cached connections. After a connection object is established, the connection object is added to both the WeakHashMap and the HashMap, as shown by the WeakHashMap 620 and HashMap 625, which now contain the connection object as represented by 621 and 626 respectively.

Figure 6B:
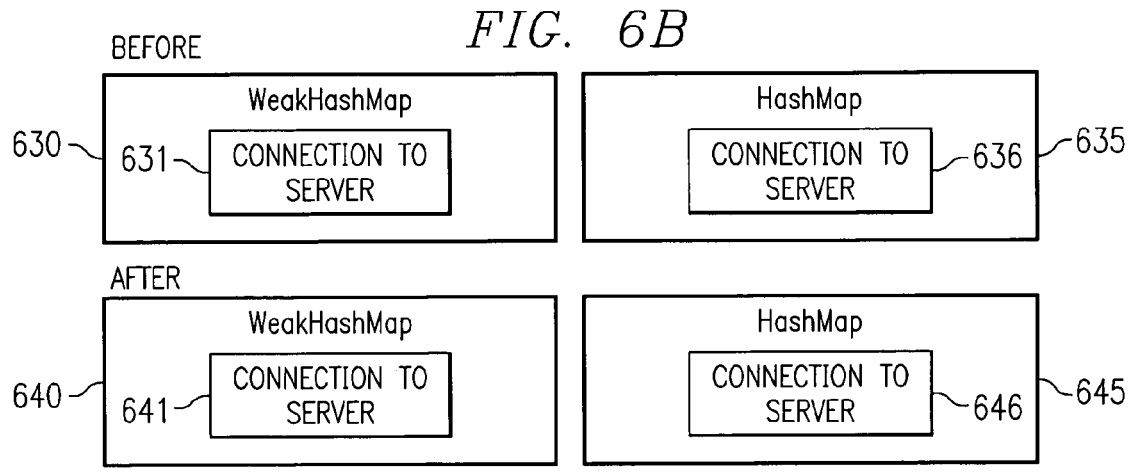

Turning to FIG. 6B, the flow is shown when a connection object is reused before the connection expiration thread removes the connection from the HashMap. The WeakHashMap 630 and HashMap 635 both contain the connection object as shown by 631 and 636. After the connection object is reused, the contents of the WeakHashMap 640 and HashMap 645 are unchanged; they still contain the connection object as represented by 641 and 646.

Figure 6C:
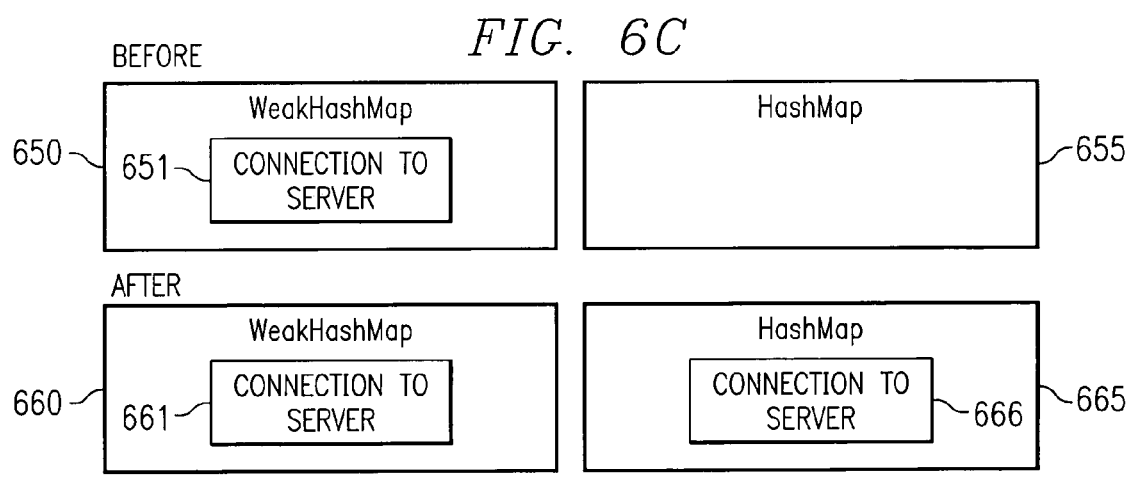

With reference now to FIG. 6C, the flow is shown when a connection object is reused after the connection expiration thread removes the connection object from the HashMap, but before the RMI server has closed and destroyed the connection. WeakHashMap 650 is shown to contain connection 651. HashMap 655 is empty, since the connection expiration thread has removed the connection from the HashMap. After the connection object has been reused, the connection object is added to the HashMap, as shown by WeakHashMap 660 and HashMap 665. The connection is contained within both the WeakHashMap and HashMap, as represented by 661 and 666.

Figure 6D:
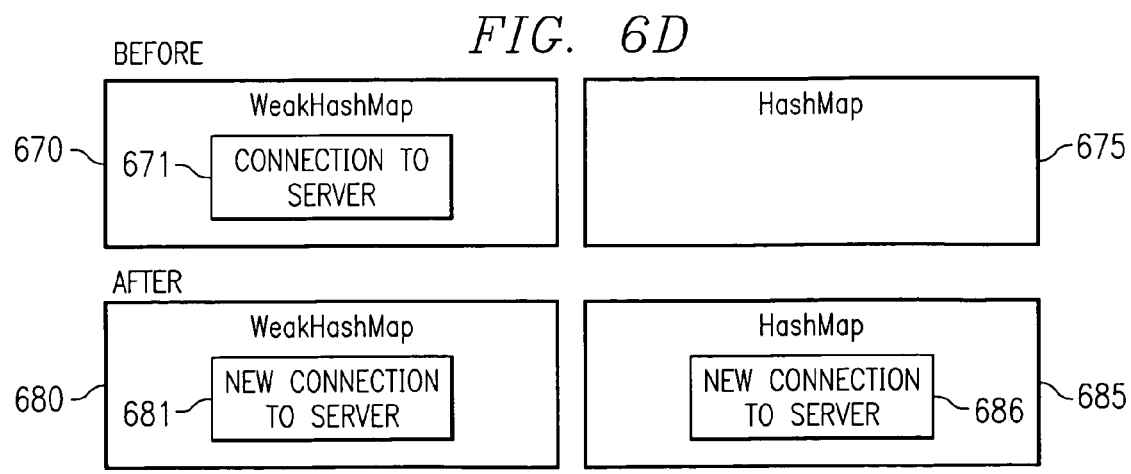

Finally, turning to FIG. 6D, the flow is shown when an attempt is made to reuse a connection object which has been removed from the HashMap by the connection expiration thread and has been closed and destroyed by the RMI server. The WeakHashMap 670 is shown with connection 671, and the HashMap 675 is empty, since the connection has been removed from the HashMap 675 by the connection expiration thread. When the connection object 671 is queried from the WeakHashMap 670, it is tested and found to be bad, or closed. At this point, the connection object 671 is removed from the WeakHashMap 670. A new connection is established to the server and a new connection object is created and added to both the WeakHashMap and the HashMap. The WeakHashMap 680 and HashMap 685 both contain the new connection object, as shown by 681 and 686, after it has been established and used.

Figure 7:
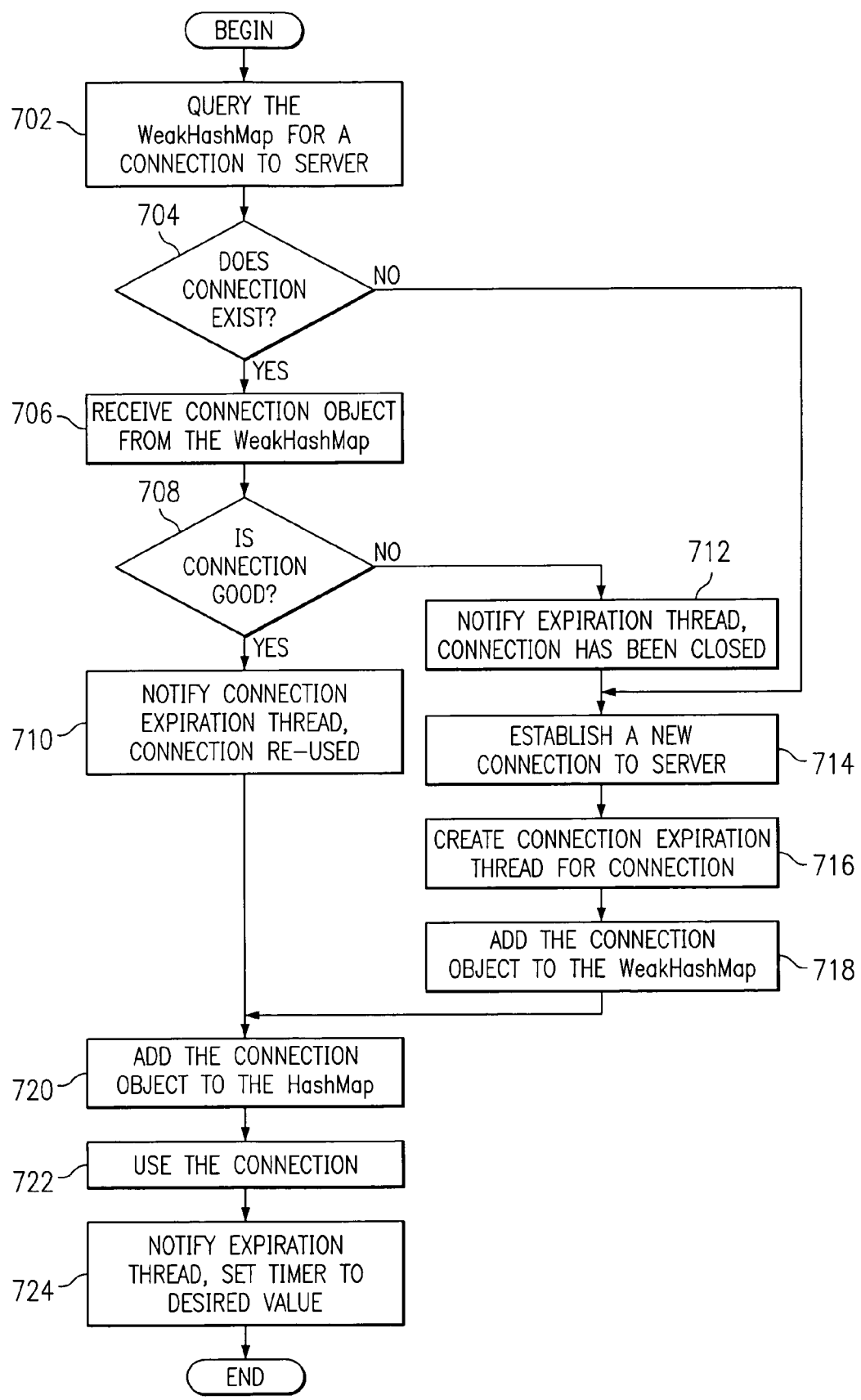
FIG. 7 is a flowchart illustrating the operation of an RMI client in accordance with a preferred embodiment of the present invention.

With reference to FIG. 7, a flowchart illustrating the operation of an RMI client is shown in accordance with a preferred embodiment of the present invention. The process begins and queries the WeakHashMap for a connection to a server (step 702). A determination is made as to whether a connection exists (step 704). If a connection exists, the process receives the connection object from the WeakHashMap (step 706) and a determination is made as to whether the connection is good by invoking the test method of the connection object (step 708).

If the connection is good, the process notifies the connection expiration thread for this connection and the connection is reused (step 710). Thereafter, the process adds the connection object to the HashMap (step 720), uses the connection (step 722), notifies the expiration thread and sets the connection expiration thread timer to a desired value (step 724), and ends.

If the connection is not good in step 708, the process notifies the expiration thread that the connection has been closed (step 712), establishes a new connection to the server (step 714), creates a connection expiration thread for the new connection (step 716), and adds the connection object to the WeakHashMap (step 718). Then, the process adds the connection object to the HashMap (step 720), uses the connection (722), notifies the expiration thread and sets the timer to a desired value (step 724), and ends.

Returning to step 704, if the connection does not exist, the process establishes a new connection to the server (step 714), creates a connection expiration thread for the new connection (step 716), and adds the connection object to the WeakHashMap (step 718). Then, the process adds the connection object to the HashMap (step 720), uses the connection (722), notifies the expiration thread and sets the timer to a desired value (step 724), and ends.

With reference now to FIG. 8, a flowchart is shown illustrating the operation of a connection expiration thread running on an RMI client in accordance with a preferred embodiment of the present invention. The process begins and enters an efficient wait state (step 802). The term "wait state" refers to a thread that is waiting for something. If the thread is repeatedly polling the value of some variable, this would be considered a non-efficient wait state, as the thread is actively performing operations during the wait state. If the thread is waiting for an external trigger, this would be considered an efficient wait state. In an efficient wait state, the thread is inactive, and will not be scheduled to run by the operating system. The thread will only be scheduled to run once the appropriate event has taken place which "wakes it up." Most operating systems provide a mechanism to allow for efficient wait states. In the usual case, a semaphore or lock is obtained by a thread. The thread then notifies the operating system that it will enter an efficient wait state on this semaphore or lock. The thread will then be marked inactive by the operating system, and will not be scheduled to run. The operating system will mark the thread as active and allow it to be scheduled and run only when the semaphore or lock that the thread previously designated has changed state. The process remains in this wait state until it is notified either to end because the connection was closed or to set the expiration timer value and start the timer.

Once the process has been notified, a determination is made as to why it was notified (step 804). If it was notified because the connection was closed, the process ends. If it was notified to set the expiration timer value and start the timer, it enters an efficient wait state and waits until the timer expires or it is notified that the connection is going to be reused (step 806).

The process then makes a determination as to why the wait in step 806 ended (step 808). If the wait ended because the process was notified that the connection object is being reused, the process returns to step 802 to wait to be notified to set the expiration timer again when the connection is done being used. If the wait ended because the timer expired, the process removes the connection from the HashMap (step 810), and returns to step 802 to wait to be notified either to set the expiration timer again if the connection has been reused after it was removed from the HashMap or to end the process because the connection has been closed.

With reference to FIG. 9, a flowchart illustrating the operation of an RMI server is shown in accordance with a preferred embodiment of the present invention. The process begins and creates a connection object (step 902). Next, the process exports the connection in the RMI runtime environment (step 904) and sends the connection object to the RMI client (step 906). Thereafter, the RMI server process enters an efficient wait state and waits to be notified via the Unreferenced interface (step 1008 of FIG. 10). Once the process has been notified by the Unreferenced interface, the process unexports the connection from the RMI runtime (step 910), the connection is available for garbage collection (step 912), and the process ends. The term "exports" refers to the process of making an RMI remote object available to be distributed to an RMI client. The term "unexports" is the reverse of this process. When a RMI remote object is unexported, it becomes unavailable to RMI clients.

Turning now to FIG. 10, a flowchart is shown illustrating the operation of the RMI runtime environment running on the RMI server in accordance with a preferred embodiment of the present invention. The flow shown in FIG. 10 is the mechanism that runs on the RMI server that detects when a client JVM has dropped the normal reference to a connection. When the client JVM drops the normal reference to a connection, the RMI server will detect this in step 1004, and will invoke the unreferenced interface for the connection object (step 1008). When the unreferenced interface is invoked on the connection object, it responds by unexporting the connection from the RMI runtime (step 910) of FIG. 9, which in turn makes the connection available for garbage collection (step 912). The process begins and enters an efficient wait state and waits for a preset length of time (step 1002). The process scans the RMI runtime environment (step 1004) for a reference to the connection and a determination is made as to whether a reference exists (step 1006).

If a reference exists, the process returns to step 1002 to wait again. If a reference does not exist in step 1006, the process invokes the unreferenced interface for the connection (step 1008) and ends.

Thus, the present invention solves the disadvantages of the prior art by implementing an efficient caching mechanism for Java RMI remote objects that implement the Unreferenced interface. In order to efficiently implement a cache for these connection objects, the client JVM may hold a normal reference to the object while the connection is in use and for a period of time thereafter. After that period of time expires, only a weak reference is held by the client JVM and the connection may be garbage collected. The period of time may be adjusted to suit the needs of the server JVM. A shorter time may be used to ensure responsiveness of the server JVM to memory demand and shutdown requests, while a longer time may be used to enhance the effectiveness of the caching mechanism by forcing connections to stay open longer after they are no longer being used and before they are automatically garbage collected.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a client, for managing connections to a server in a distributed environment, comprising:
   establishing a connection to a server;
   responsive to conclusion of a communication process using the connection, starting a timer;
   maintaining a normal reference to a connection object for the connection;
   responsive to conclusion of a predetermined time period measured by the timer, maintaining a weak reference to the connection object; and
   periodically destroying connection objects maintained by weak references.

2. The method of claim 1, further comprising:
   determining whether a normal reference to the connection object exists; and reusing the connection if the normal reference exists.

3. The method of claim 2, further comprising restarting the timer.

4. The method of claim 1, further comprising:
   determining whether a weak reference to the connection object exists;
   determining whether the connection object has been destroyed if the weak reference exists; and
   reusing the connection if the connection object has not been destroyed.

5. The method of claim 4, further comprising restarting the timer.

6. The method of claim 4, further comprising:
   establishing a new connection if the connection object has been destroyed.

7. The method of claim 1, further comprising:
   sending notification to the server that the connection object is unreferenced when a weak reference to the connection object is maintained.

8. The method of claim 1, wherein the step of periodically destroying connection objects maintained by weak references comprises destroying the connection object in response to garbage collection by the server.

9. The method of claim 1, wherein the client is a client virtual machine that translates machine independent code to machine dependent code.

10. The method of claim 9, wherein the server is a server virtual machine that translates machine independent code to machine dependent code.

11. The method of claim 10, wherein the client virtual machine and the server virtual machine reside on the same host machine.

12. The method of claim 10, wherein the server virtual machine resides on a host machine that is remote from the machine on which the client virtual machine resides.

13. A method, in a client, for caching connections to a server, comprising:
- receiving a connection object for a connection from a server;
- adding a reference to the received connection object to a weak hash map and a hash map, wherein the weak hash map maintains weak references to objects and the hash map maintains normal references to objects;
- responsive to conclusion of a communication process using the connection, starting a timer; and
- responsive to conclusion of a predetermined time period measured by the timer, removing the reference to the connection object from the hash map while maintaining the reference to the connection object in the weak hash map.

14. The method of claim 13, wherein the connection is between the client and the server, and the connection object is used to enable the connection between the client and server, further comprising:
- determining whether the connection object has been destroyed; and
- removing the reference to the connection object from the weak hash map if the connection object has been destroyed; and
- maintaining the reference to the connection object in the weak hash map if the connection object has not been destroyed to thereby allow use of such connection object by a subsequent communication process between the client and server without establishing a new connection between the client and server.

15. An apparatus, in a client, for managing connections to a server in a distributed environment, comprising:
- connection means for establishing a connection to a server;
- timer means for starting a timer responsive to conclusion of a communication process using the connection;
- normal reference means for maintaining a normal reference to a connection object for the connection;
- weak reference means for maintaining a weak reference to the connection object responsive to conclusion of a predetermined time period measured by the timer; and
- garbage collection means for periodically destroying connection objects maintained by weak references.

16. The apparatus of claim 15, further comprising:
- means for determining whether a normal reference to the connection object exists; and
- means for reusing the connection if the normal reference exists.

17. The apparatus of claim 16, further comprising means for restarting the timer.

18. The apparatus of claim 15, further comprising:
- means for determining whether a weak reference to the connection object exists;
- means for determining whether the connection object has been destroyed if the weak reference exists; and
- means for reusing the connection if the connection object has not been destroyed.

19. The apparatus of claim 18, further comprising means for restarting the timer.

20. The apparatus of claim 18, further comprising:
- means for establishing a new connection if the connection object has been destroyed.

21. The apparatus of claim 15, further comprising:
- means for sending notification to the server that the connection object is unreferenced when a weak reference to the connection object is maintained.

22. The apparatus of claim 15, wherein the client is a client virtual machine that translates machine independent code to machine dependent code.

23. The apparatus of claim 22, wherein the server is a server virtual machine that translates machine independent code to machine dependent code.

24. The apparatus of claim 23, wherein the client virtual machine and the server virtual machine reside on the some host machine.

25. The apparatus of claim 23, wherein the server virtual machine resides on a host machine that is remote from the machine on which the client virtual machine resides.

26. An apparatus, in a client, for caching connections to a server, comprising:
- receiving means for receiving a connection object for a connection from a server;
- reference means for adding a reference to the connection object to a weak hash map and to a hash map, wherein the weak hash map maintains weak references to objects and the hash map maintains normal references to objects;
- timer means for starting a timer responsive to conclusion of a communication process using the connection; and
- removal means for removing the reference to the connection object from the hash map responsive to conclusion of a predetermined time period measured by the timer while maintaining the reference to the connection object in the weak hash map.

27. The apparatus of claim 26, wherein the connection is between the client and the server, and the connection object is used to enable the connection between the client and server, further comprising:
- means for determining whether the connection object has been destroyed; and
- means for removing the reference to the connection object from the weak hash map if the connection object has been destroyed; and
- means for maintaining the reference to the connection object in the weak hash map if the connection object has not been destroyed to thereby allow use of such connection object by a subsequent communication process between the client and server without establishing a new connection between the client and server.

28. A computer program product; in a computer readable medium, for managing connections in a distributed environment, comprising:
- instructions for establishing a connection;
- instructions for starting a timer responsive to conclusion of a communication process using the connection;
- instructions for maintaining a normal reference to a connection object for the connection;
- instructions for maintaining a weak reference to the connection object responsive to conclusion of a predetermined time period measured by the timer; and
- instructions for periodically destroying connection objects maintained by weak references.

29. A computer program product, in a computer readable medium, for caching connections to a server, comprising:
- instructions for receiving a connection object for a connection from a server;

instructions for adding a reference to the connection object to a weak hash map and a hash map, wherein the weak hash map maintains weak references to objects and the hash map maintains normal references to objects;

instructions for starting a timer responsive to conclusion of a communication process using the connection; and instructions for removing the reference to the connection object from the hash map responsive to conclusion of a predetermined time period measured by the timer while maintaining the reference to the connection object in the weak hash map.

* * * * *